(12) United States Patent
Müller (10) Patent No.: US 12,549,063 B2
(45) Date of Patent: Feb. 10, 2026

(54) FURNITURE DRIVE WITH AN ELECTRIC DRIVE MOTOR WITH A BRAKING DEVICE

(71) Applicant: DEWERTOKIN TECHNOLOGY GROUP CO., LTD., Jiaxing (CN)

(72) Inventor: Christian Müller, Rahden (DE)

(73) Assignee: DewertOkin Technology Group Co., Ltd., Jiaxing (CN)

( * ) Notice: Subject to any disclaimer, the term of this patent is extended or adjusted under 35 U.S.C. 154(b) by 208 days.

(21) Appl. No.: 18/281,056

(22) PCT Filed: Mar. 3, 2022

(86) PCT No.: PCT/IB2022/051884
§ 371 (c)(1),
(2) Date: Sep. 8, 2023

(87) PCT Pub. No.: WO2022/189912
PCT Pub. Date: Sep. 15, 2022

(65) Prior Publication Data
US 2024/0162782 A1    May 16, 2024

(30) Foreign Application Priority Data
Mar. 11, 2021    (DE) ............ 20 2021 101 238.2

(51) Int. Cl.
*H02K 7/102*    (2006.01)
*A47C 31/00*    (2006.01)
(Continued)

(52) U.S. Cl.
CPC ............ *H02K 7/102* (2013.01); *A47C 31/00* (2013.01); *F16D 59/00* (2013.01); *H02K 7/1166* (2013.01);
(Continued)

(58) Field of Classification Search
CPC ............... B41J 2/04541; B41J 2/04581; B41J 2/04588; B41J 2/04593; A47C 31/00;
(Continued)

(56) References Cited

U.S. PATENT DOCUMENTS

| | | |
|---|---|---|
| 5,825,338 A | 10/1998 | Salmon et al. |
| 9,713,387 B2 | 7/2017 | Hille |

(Continued)

FOREIGN PATENT DOCUMENTS

| | | |
|---|---|---|
| CN | 103378708 A | 10/2013 |
| DE | 69224639 T2 | 7/1998 |

(Continued)

OTHER PUBLICATIONS

International Search Report and Written Opinion mailed Jun. 8, 2022 in related/corresponding International Application No. PCT/IB2022/051884.

(Continued)

*Primary Examiner* — Naishadh N Desai
(74) *Attorney, Agent, or Firm* — PATENT PORTFOLIO BUILDERS PLLC (57) ABSTRACT

A furniture drive includes an electric drive motor and a brake device. The drive motor has an output shaft which projects beyond a motor housing and the brake device has at least one brake element and one force accumulator. The force accumulator permanently loads a friction surface of the at least one brake element with a brake force. The force accumulator and the brake element are configured in one piece. Coefficients of static and sliding friction between the friction surface of the brake element and the output shaft differ by a factor of at least 1.3. An EMF brake is provided for the drive motor.

17 Claims, 9 Drawing Sheets

(51) Int. Cl.
  *F16D 59/00*  (2006.01)
  *H02K 7/116*  (2006.01)
  *F16D 127/00*  (2012.01)

(52) U.S. Cl.
  CPC ............... *F16D 2127/002* (2013.01); *F16D 2200/0026* (2013.01)

(58) Field of Classification Search
  CPC ....... F16D 2127/002; F16D 2200/0026; F16D 59/00; F16D 7/024; H02K 7/06; H02K 7/102; H02K 7/106; H02K 7/1166
  See application file for complete search history.

(56) References Cited

U.S. PATENT DOCUMENTS

| | | | |
|---|---|---|---|
| 11,374,516 B2 | 6/2022 | Hille | |
| 11,411,464 B2 * | 8/2022 | Kuhn | H02K 7/102 |
| 11,539,266 B2 * | 12/2022 | Müller | F16D 49/02 |
| 2009/0256514 A1 * | 10/2009 | Earleson | B60L 15/04 |
| | | | 318/521 |
| 2014/0028151 A1 * | 1/2014 | Morita | H10N 35/101 |
| | | | 310/12.14 |
| 2018/0219453 A1 * | 8/2018 | Kuhn | F16D 65/06 |
| 2020/0014280 A1 * | 1/2020 | Müller | F16D 49/02 |

FOREIGN PATENT DOCUMENTS

| | | |
|---|---|---|
| DE | 202004008713 U1 | 7/2004 |
| DE | 202004008714 U1 | 7/2004 |
| DE | 102009059267 A1 | 6/2011 |
| DE | 102017131226 A1 | 6/2019 |
| EP | 3596808 B1 | 7/2021 |
| WO | 2013127940 A2 | 9/2013 |
| WO | 2017016618 A1 | 2/2017 |

OTHER PUBLICATIONS

Search Report created Oct. 20, 2021 in related/corresponding DE Application No. 20 2021 101 238.2.
Wikipedia; "Reibungskoeffizient;" Oct. 18, 2020; https://de.wikipedia.org/w/index.php?title=Reibungskoeffzient&oldid=204658755.

* cited by examiner

FURNITURE DRIVE WITH AN ELECTRIC DRIVE MOTOR WITH A BRAKING DEVICE

BACKGROUND AND SUMMARY OF THE INVENTION

Exemplary embodiments of the invention relate to a furniture drive with an electric drive motor and a braking device for the electric drive motor, wherein the drive motor has an output shaft and the braking device has at least one braking element acting on the output shaft and a force accumulator, wherein the force accumulator permanently applies a braking force to the braking element and wherein the force accumulator and the braking element are formed integrally with one another.

Electric drive motors are used in a variety of applications, including electric furniture drives that are used to adjust a piece of furniture. The furniture part can be, for example, a headboard or footboard of a bed or seating furniture. The driving force of the drive motor is often transmitted to the furniture part via a worm gear with a downstream spindle drive. The worm gear is formed by a worm mounted or formed on the output shaft of the drive motor in conjunction with a worm wheel in which the worm engages. The worm gear offers the advantage of high friction inhibition, which can prevent lowering of a weight-loaded furniture part when the motor is off.

Particularly in the care sector, high demands are placed on self-inhibition, also called self-locking. Even with an unfavorably positioned patient, a head or foot section, for example, of a hospital bed must not lower. To meet these high requirements, it may be necessary to provide a braking device in addition to the inhibition by the worm gear, which brakes the output shaft of the motor when the motor comes to a standstill and thus reliably prevents the furniture part from lowering.

Such braking devices can be designed as actively controllable brakes which, for example, are electromechanically actuated to brake the output shaft of the motor at standstill.

Alternatively, non-actively controlled brakes can also be used for an output shaft of an electric drive motor. Such brakes are known from the publications DE 20 2004 008 713 U1 and DE 20 2004 008 714 U1. In these braking devices, there is a slight permanent braking of the output shaft, which is overcome during operation of the drive motor by its torque, but which is nevertheless sufficiently large to prevent unintentional rotation of the electric drive motor by loading of the adjustable furniture part when at a standstill in conjunction with the self-locking effect of the worm gear.

The braking devices presented in the aforementioned writings each have a force accumulator device, for example a spring, which permanently applies a braking force to a braking element. The braking force presses the braking element, for example, against a brake rotor that is non-rotatably connected to the output shaft of the motor. Compared with actively controlled braking devices, they are simpler in design and therefore generally less expensive. However, they are not simple to manufacture, since it must be ensured that the force accumulators and braking elements, which are generally made of different materials, are securely connected to each other without increasing the manufacturing effort.

A passive braking device is known from WO 2017/016618 A1, in which the force accumulator and the braking element are formed in one piece. This is based on the idea that, with appropriate shaping, the braking element itself can achieve sufficient spring action to apply a required braking force. For example, the braking device can be annular in shape, with a self-contained annular base body having a central opening for receiving a section of the output shaft of the drive motor. Preferably, incisions extending radially and/or obliquely and open inwardly and/or outwardly are made in the basic body. The fact that the base body is circumferentially closed in itself enables it to exert a radially acting braking force on the output shaft guided through the central opening.

The braking device specified in WO 2017/016618 A1 is simple to manufacture and inexpensive, and is successfully used in particular for electric motor furniture drives.

Exemplary embodiments of the present invention are directed to further improving a furniture drive with electric drive motor and braking device of the type mentioned at the beginning in order to achieve the best possible braking effect when stationary with only low losses during operation.

A furniture drive of the type mentioned above according to the invention is characterized by the fact that in the braking device static or sliding friction coefficients between the friction surface of the braking element and the output shaft differ by a factor of at least 1.3 and in particular at least 1.5. Furthermore, an EMF (electromotive force) brake is provided in the furniture drive, which is activated, for example, by causing a short circuit at connections of the drive motor by a control device of the furniture drive.

The invention is based on the finding that a combination of an EMF brake and a passive friction brake achieves particularly good braking properties when there is a relatively large difference between the static and dynamic friction coefficients for the braking element/output shaft pairing. This can be achieved, for example, by suitable material selection and surface finish, with the output shaft usually being made from a strong but unhardened steel. The greatest possible difference results in a good braking effect at standstill and a low braking effect when the drive motor rotates, and thus in low losses during operation.

EMF braking is more effective the higher the speed of the drive motor because of the regenerative effect it exploits. This means that the drive motor can be quickly brought from high to low speed with the aid of the EMF brake. An EMF brake can also be easily implemented with only a small number of components. As soon as the low speed is reached, the passive braking device takes effect, since the high coefficient of static friction relative to the coefficient of dynamic friction leads to a high braking effect not only when the output shaft is at a standstill, but also at low speeds and approaching standstill. This is because elastic deformations within the braking device can cause the friction surface to come to a standstill relative to the surface of the output shaft for a short time even when the output shaft is still rotating at low speeds, which then results in a transition from sliding friction to static friction. Even if the static friction is overcome again when the output shaft continues to rotate, a static friction effect has acted for a short time and thus on average a higher static friction than the pure sliding friction. The braking effect is therefore effectively higher than described by the coefficient of sliding friction. The time proportion for which this effect occurs at a given speed becomes greater, the greater the factor between the static and dynamic friction coefficients is. As the time fraction increases, so does the excess of the braking effect due to this effect when the output shaft is still rotating.

Due to the high difference between the sliding friction and the static friction of the braking device, a pronounced transition range of the braking effect is thus formed, which extends in a span from a low speed, i.e., a speed close to standstill, to zero speed. The span of this pronounced transition lies in the range zero to one revolutions per second. The span width and the physical character of the transition area are preferably designed to be independent of the direction of rotation, but can alternatively and depending on the geometries and surface properties of the friction partners differ depending on the direction of rotation.

Particularly preferably, the furniture drive is designed as a spindle drive, especially a spindle lifting drive. Due to the spindle, possibly in combination with a worm drive, the furniture drive already has a high degree of self-inhibition. Together with the combination of passive braking device and EMF brake according to the invention, safe braking is achieved.

The material of the braking element can be zinc or bronze, for example, or a plastic that is as resistant to high temperatures as possible, such as PEEK (polyetheretherketone).

The materials mentioned are generally softer than the commonly used output shaft material, namely solid, unhardened steel, so that braking of the output shaft does not result in damage to the surface of the output shaft. Nevertheless, the aforementioned materials are hard enough to provide a braking effect that is as wear-free as possible and thus, a long service life cycle is achieved. If, in addition, further agents such as lubricants are used, which can be applied very thinly, the service life is further increased. If selected appropriately, the lubricants do not reduce the factor between the static and the sliding friction or, on the contrary, can even increase it.

In an advantageous embodiment of the furniture drive, the force accumulator and the braking element are made of the same material, which can further reduce manufacturing costs and manufacturing effort.

In a further advantageous embodiment of the furniture drive, the braking device is annular, wherein a self-contained annular base body has a central opening for receiving a section of the output shaft of the drive motor. Preferably, incisions are made in the base body that extend radially and/or obliquely and are open inwardly and/or outwardly. The fact that the base body is circumferentially closed in itself means that it can exert a radially acting braking force on the output shaft guided through the central opening by itself, i.e., without support from external components.

The incisions reduce the material thickness of the ring-shaped base body so that the base body can be expanded more easily and the desired spring effect is achieved. The number and depth of the incisions makes it possible to set the desired spring force and also the spring travel for the material used for the base body. In this way, a material that is in itself relatively hard and not particularly elastic can be used for the base body, which accordingly wears little despite the applied braking effect and yet still produces a spring effect with sufficient spring travel and a required and, in particular, not too strong spring force. Several incisions can preferably be arranged in a star shape. Inwardly and outwardly open incisions can preferably alternate circumferentially.

In its ring-shaped design, the braking device can be simply and space-savingly plugged onto the output shaft and rest against the motor housing or inserted into a receptacle in the motor housing. To fix the braking device, only axial slippage of the motor shaft must be prevented, which can be achieved by retaining or latching projections. Furthermore, the braking device must be secured against rotation, which can likewise be achieved, for example, by means of detent or retaining projections arranged on the motor housing. These projections can engage, for example, in the aforementioned recesses in the basic body of the braking device.

Alternatively, projections can be arranged on the outer circumference of the basic body that cooperate in recesses of retaining elements arranged, for example, on the motor housing and fix the braking device non-rotatably to the motor housing. The retaining or latching projections or the retaining elements can be arranged or formed on the motor housing itself or on a motor mount.

Particularly advantageously, a surface of the base body itself forms the friction surface of the at least one braking element. In this way, a particularly simple construction of the braking device is achieved, especially if the braking element is made of plastic in an injection molding process.

Alternatively, however, it is also possible to apply at least one additional ring segment to the base body, which faces the central opening. In this case, one surface of the ring segment forms the friction surface of the at least one braking element. In this way, a friction surface particularly suitable for braking can be provided irrespective of the material of the base body.

In a further advantageous embodiment of the furniture drive, the braking device is formed in or on a motor mount, e.g., a motor mounting plate or a motor flange mount. This further reduces manufacturing and assembly costs of the furniture drive. One embodiment of a motor flange mount is formed by a housing part or a gearbox housing part of the furniture drive, to which the motor is flange-mounted and fastened. In this case, the housing or the gear housing has a receptacle for the braking device. The receptacle can be designed as a recess and the braking device can be inserted there. The receptacle of the braking device has projections or recesses as described above for a rotationally fixed connection and rotationally fixed mounting of the braking device.

Alternatively, with the same advantage, the braking device can also be integrated into the electric drive motor and there, in particular, additionally assume the function of a plain bearing for the output shaft. In particular, the rear axle bearing of a drive motor is often not designed as a ball bearing but as a plain bearing. The standard plain bearing can be replaced by the braking device with plain bearing function according to the invention.

The braking device can be used with a gearless drive motor where the output shaft is an armature shaft of the motor. However, it can also be used with a geared motor in which the motor and gearbox may form a unit and in which the output shaft is a gear shaft.

BRIEF DESCRIPTION OF THE DRAWING FIGURES

The invention is explained in more detail below by means of embodiment with the aid of figures. The figures show.

DETAILED DESCRIPTION

Figure 1:
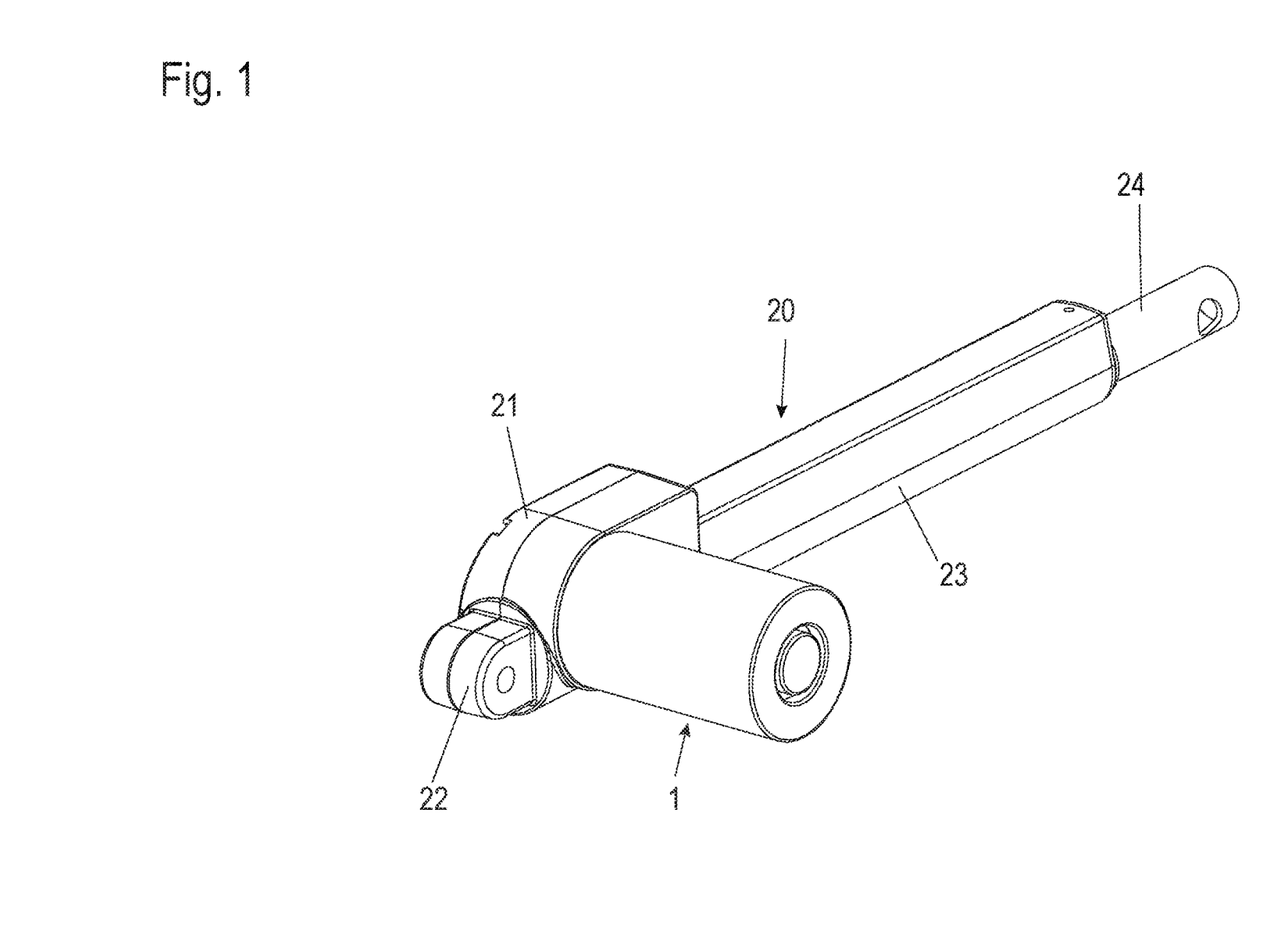
FIG. 1 an isometric general view of a furniture drive.

FIG. 1 first shows an isometric general view of an electromotive furniture drive 20. The furniture drive 20 is a so-called spindle-drive in which a rotary motion of a drive motor 1 is converted into a linear lifting motion by means of a spindle.

For this purpose, the furniture drive 20 has a gear housing 21 to which the drive motor 1 is attached. The gear housing 21 is provided with a mounting element 22, in this case a mounting eye, with which the furniture drive 20 is coupled to a piece of furniture on one side.

A guide tube 23 is further arranged on or integrally formed with the gear housing 21, which guides a lifting tube 24 that can be moved back and forth via the spindle. The free end of the lifting tube 24 is also coupled to the furniture in order to transmit the movement to the furniture.

Figure 2:
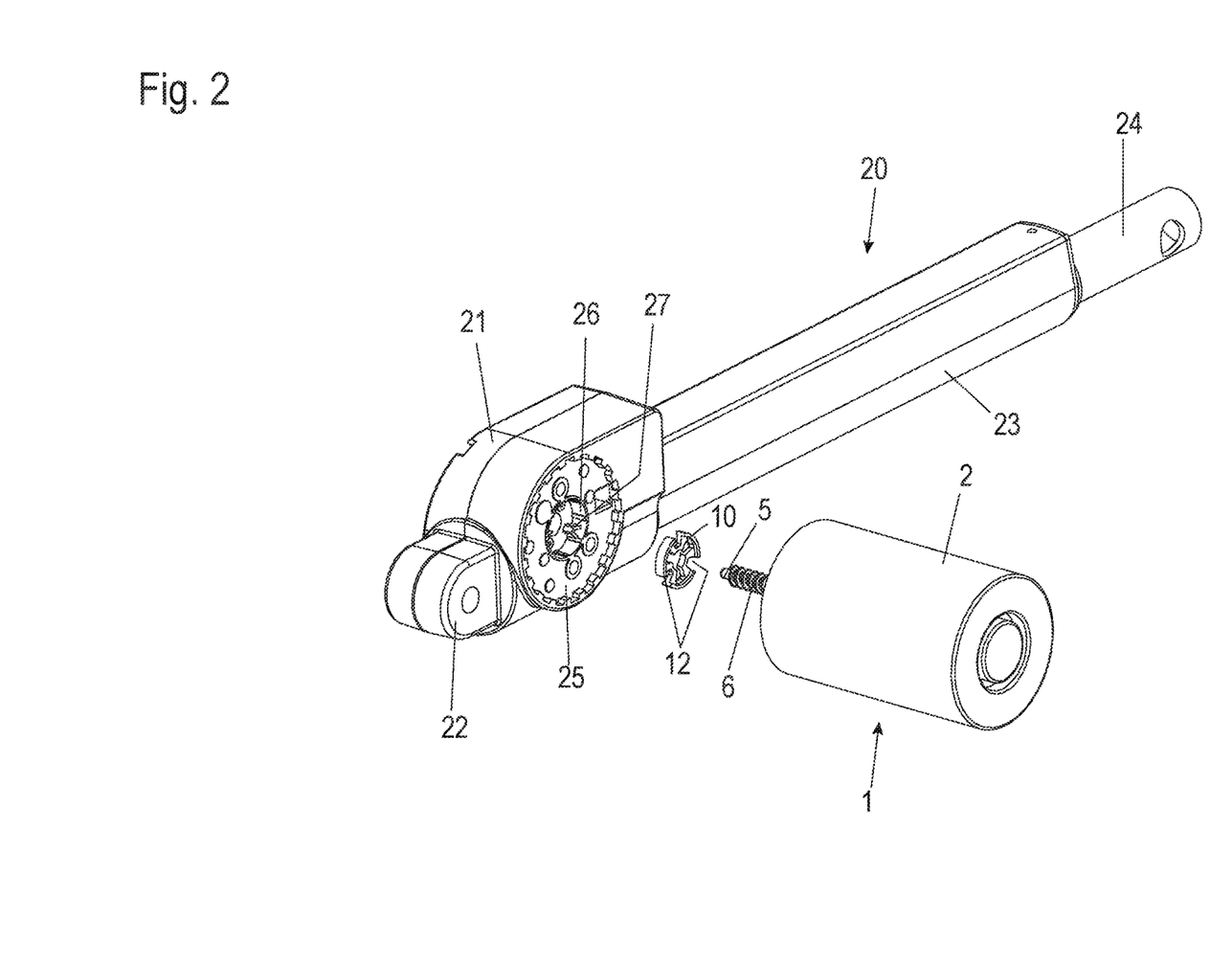
FIG. 2 the furniture drive of FIG. 1 in a partial exploded view.
Figure 3:
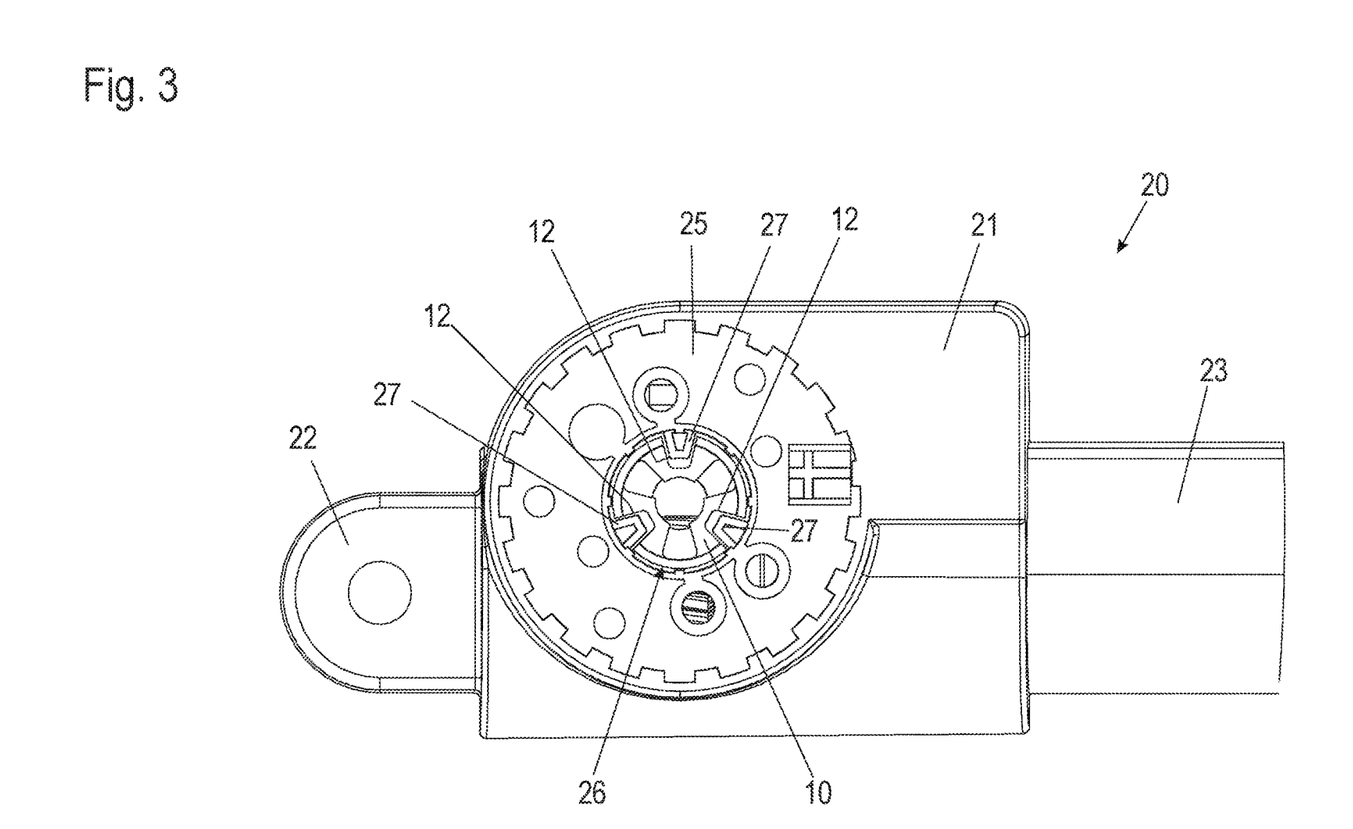
FIG. 3 a side view of the furniture drive of FIG. 1 without drive motor.

FIG. 2 shows an isometric partly exploded view of the furniture drive 20, and FIG. 3 shows a side view of a section of the furniture drive 20. In FIG. 3, the drive motor 1 is removed to allow a view of the area of the gear housing 21 in which the drive motor 1 is mounted.

A pot-shaped motor flange receptacle 25 is formed on the gearbox housing 21, into which the drive motor 1 is inserted with a flange plate (cf. reference sign 3 in FIG. 4a) and to which it is screwed. As can be seen in FIG. 2, the drive motor 1 in turn has a housing 2, above which an output shaft 5 projects in the direction of the gear housing 21, which is provided with a worm 6. When the drive motor 1 is mounted, the worm 6 projects into the gear housing 21 and meshes there with a worm wheel, not visible here, which drives the spindle.

A recess is formed centrally in the motor flange receptacle 25, which serves as a brake ring receptacle 26 and into which a braking device 10 is positively inserted. The braking device 10 acts on a section of the output shaft 5, as described in more detail in connection with FIGS. 4a, b. The annularly formed braking device 10 has along its circumference recesses 12, in which projections 27 of the brake ring receptacle 26 engage in order to hold the braking device 10 non-rotatably in the brake ring receptacle 26.

Figure 4A:
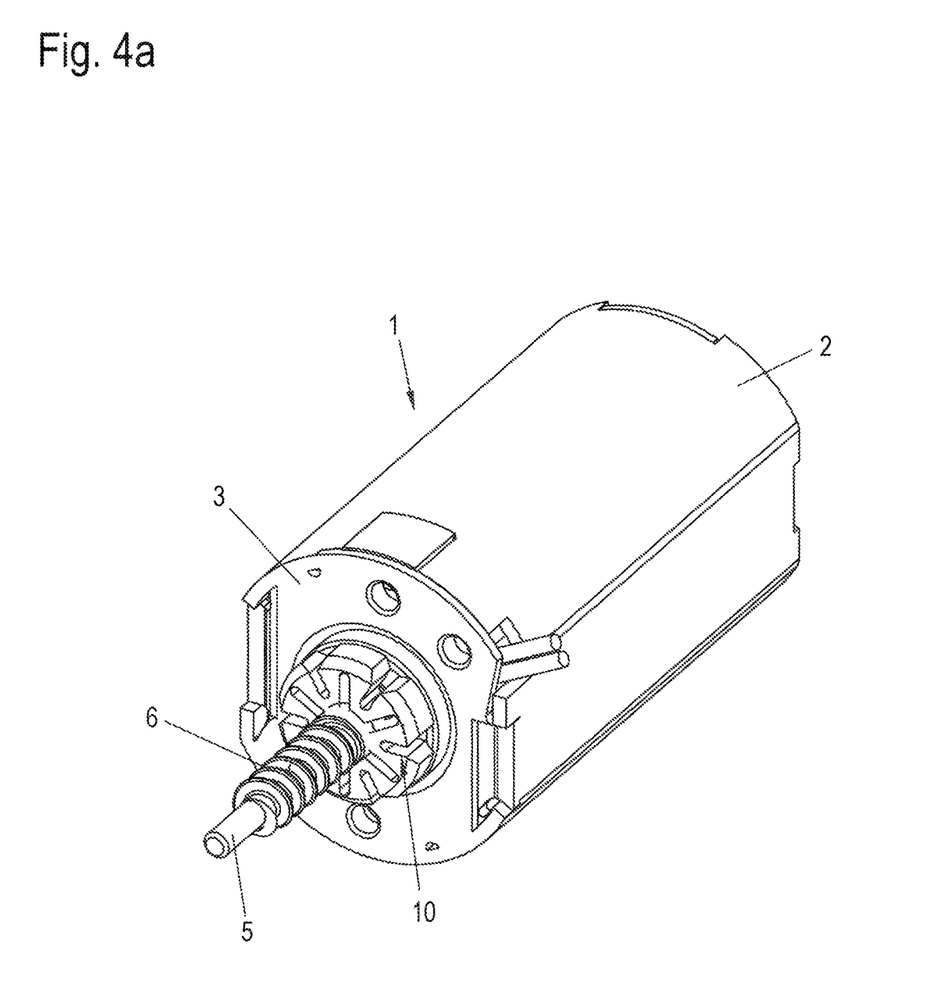
FIGS. 4a, 4b each an isometric representation of a drive motor with a braking device mounted on an output shaft of the drive motor.
Figure 4B:
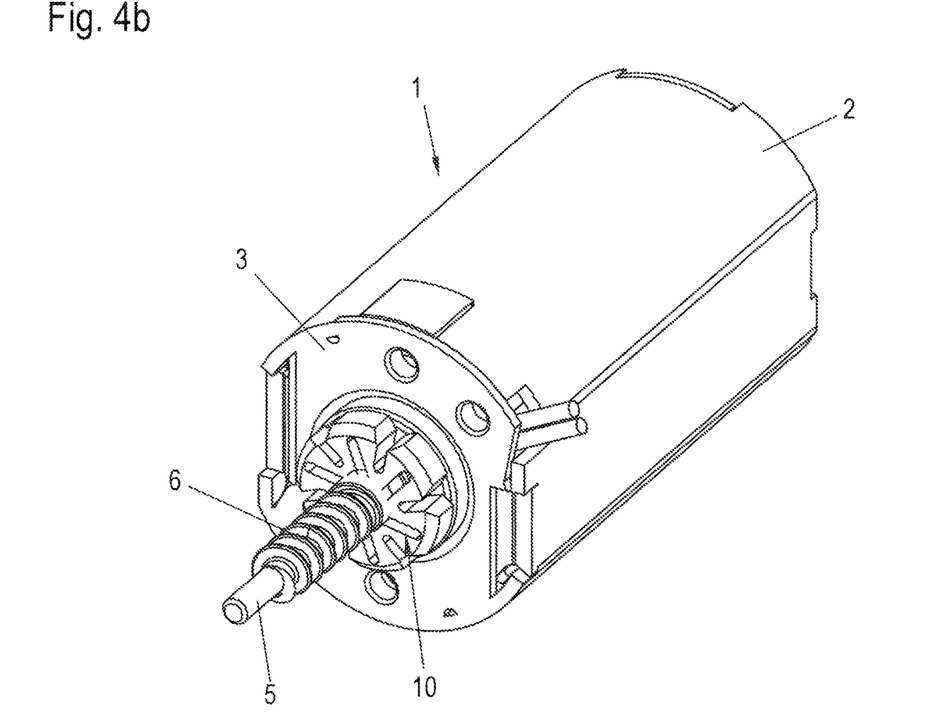
Figure 4C:
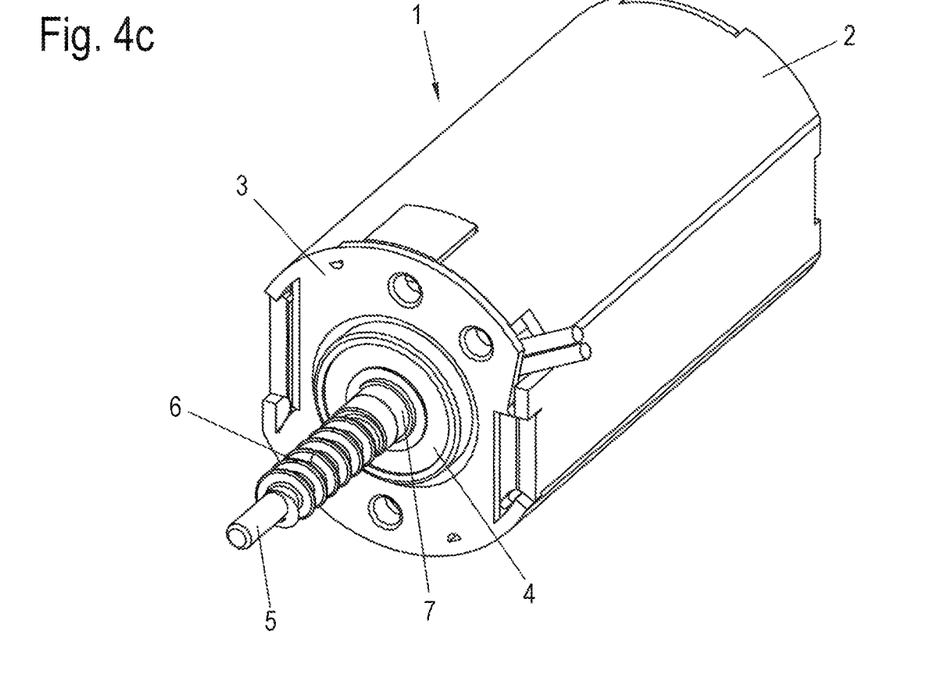
FIG. 4c a representation of the drive motor of FIGS. 4a and 4b without the braking device.

FIGS. 4a and 4b each show an electric drive motor 1 with a braking device 10 in an isometric view in the same way. FIG. 4c also shows the drive motor 1 without a braking device in the same way. The drive motor 1 is comparable to that in FIGS. 1 to 3 and could likewise be used in the furniture drive 20 of FIGS. 1 to 3.

The drive motor 1 again has a housing 2 with a flange plate 3 on which there are fastening options for the drive motor 1. Furthermore, a bearing 4 (cf. FIG. 4c) for an output shaft 5 of the drive motor 1 is arranged centrally in the flange plate 3. The bearing 4 can be held in a bearing seat of the flange plate 3 either accessible from the outside or inserted from the inside of the housing 2. A comparable bearing for the output shaft 5 is arranged on the opposite side of the housing 2. In the present case, the bearing 4 provided in the flange plate 3 is, for example, a rolling bearing, such as a ball bearing or a roller bearing. The bearing provided on the opposite side may also be such a rolling element bearing, or it may be a plain bearing.

The output shaft 5 protrudes over the flange plate 3. In addition to an optional bearing journal at the end of the output shaft 5, the latter is provided with a worm 6. The worm 6 can be a separate part mounted on the output shaft 5, or it can be formed integrally with the output shaft 5. In the area of the bearing 4, the output shaft 5 initially protrudes beyond the flange plate 3 with an axle section 7 before the worm 6 is connected to it. The axle section 7 is cylindrical with a smooth surface, wherein the diameter of the axle section 7 at least slightly exceeds the outer diameter of the worm 6.

As FIGS. 4a to 4c show, the braking device 10 is annular in shape in each case and is fitted onto the output shaft 5 to such an extent that it essentially rests against the flange plate 3 and acts on the axle section 7 of the output shaft 5.

Figure 5A:
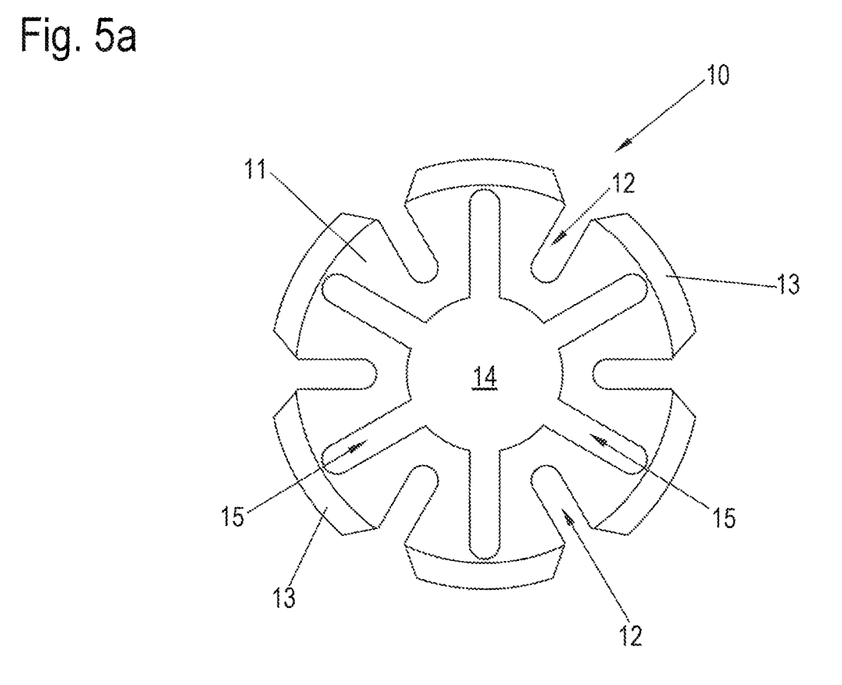
FIGS. 5a, 5b each a plan view and an isometric view of the brake element of FIGS. 4a and 4b.
Figure 5B:
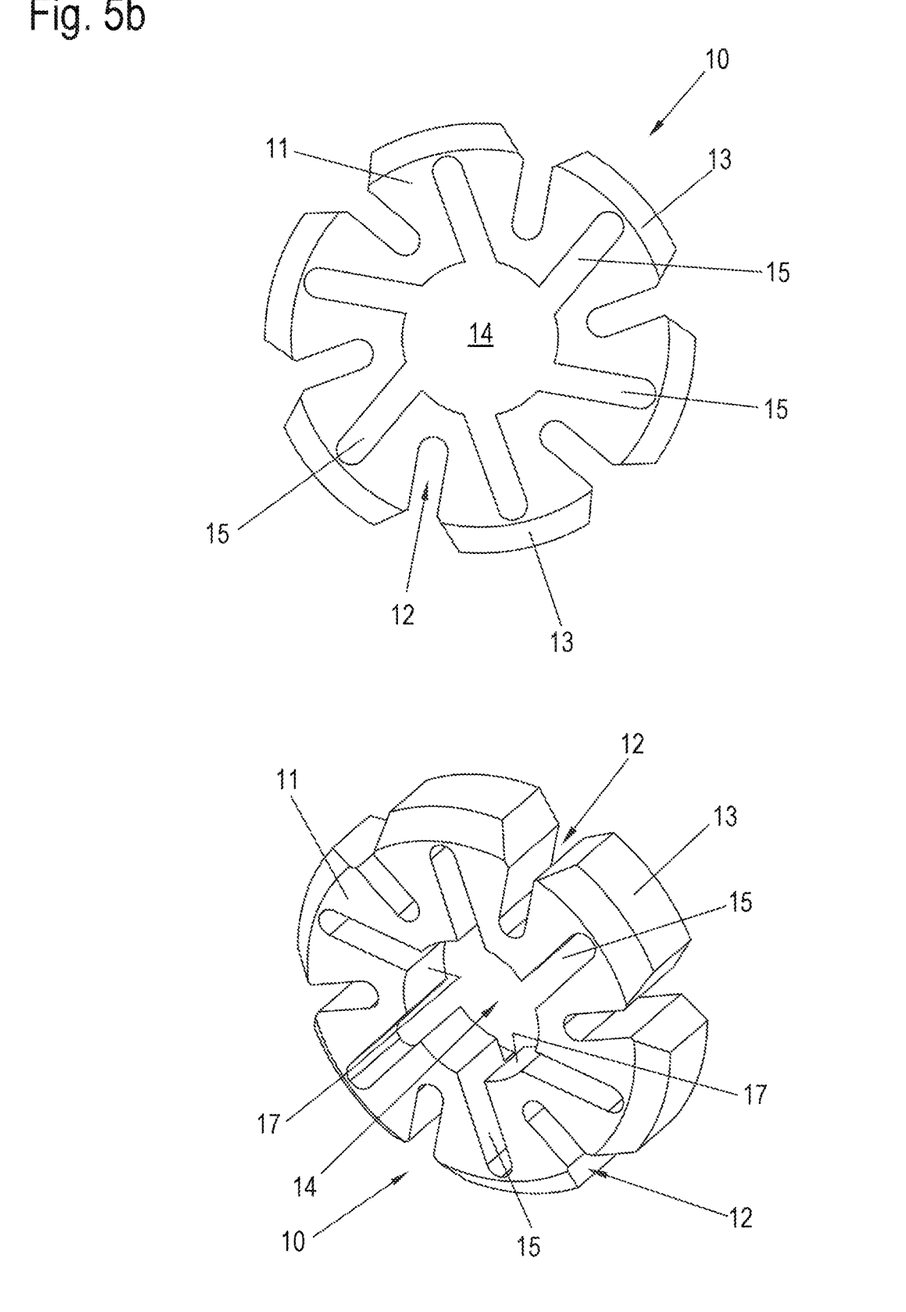

The two embodiments of the braking device 10 according to FIGS. 4a and 4b are shown in more detail in FIGS. 5a and 5b, respectively. FIGS. 5a and 5b each show in their upper part a top view of the braking device 10 and in their lower part an isometric oblique view of the braking device 10.

The braking device 10 shown in FIGS. 4a and 5a has a one-piece base body 11. This is made of a solid metal material, for example zinc or bronze, or of a hard and preferably heat-resistant plastic, for example PEEK (polyetheretherketone). The material combination and the surface properties of a friction surface of the braking device 10 and of the axle section 7 are selected such that static or sliding friction coefficients between the friction surface and the output shaft differ by a factor of at least 1.3 and in particular at least 1.5. In the case of polymer plastics, for example, the type of crosslinking degree can also be significant for the level of the factor. In particular, radiation-crosslinked plastics have a high coefficient of static friction relative to the coefficient of dynamic friction. The thickness of the base body 11 is in the range of a few millimeters and thus corresponds essentially to the length of the axle section 7 (see FIG. 4c).

Incisions 12 projecting from the outside to the inside are made in the base body 11, which are also referred to below as outer incisions 12. Six outer incisions 12 are provided in the present case, which are evenly distributed in a star-shaped arrangement. Due to the outer incisions 12, radially projecting sections 13 remain from the base body 11 in the outer region, which can be used to fix the braking device 10 in a rotationally fixed manner. For example, projections can be formed on the sections 13 that engage in stationary retaining grooves (viewed relative to the housing 2 of the drive motor 1). Alternatively, a rotationally fixed retention can be provided by stationary projections (cf. reference sign 27 in FIG. 2) which engage in the recesses 12, as can be seen in the embodiment example of FIG. 2.

Offset from the outer incisions 12 are inner incisions 15, which incise the base body 11 outwardly from the central opening 14. The outer and inner incisions 12, 15 give the braking device 10 a spring action in the radial direction. Between the inner incisions 15, sections of the basic body 11 remain in the area of the central opening 14, which press as braking elements 17 on the corresponding axle section 7 of the output shaft 5. By adjusting the number and depth of the inner recesses 15, but also the outer recesses 12, the spring action of the basic body 11 can be varied over a wide range and thus adapted to the required needs.

FIGS. 4b and 5b show a second embodiment of the braking device 10. The basic structure of the braking device 10 corresponds to that of the first embodiment example according to FIGS. 4a and 5a. In contrast thereto, however, the outer incisions 12 and the inner incisions 15 here do not extend exactly radially, but obliquely outwardly and inwardly, respectively. In alternative embodiments, it can be provided that only the outer or only the inner incisions 12, 15 run obliquely, whereas the other type of incisions 12, 15 run radially.

Due to the inclined position of at least one type of the incisions 12, 15, an asymmetry in the braking behavior is achieved with respect to the direction of rotation of the output shaft 5 relative to the braking device 10. Depending on the direction of rotation of the output shaft 5, an upward or downward effect is achieved at the braking elements 17, by which the braking effect is increased in one of the directions of rotation and weakened in the other of the directions of rotation. In this way, it can be achieved, for example, that in the case of an electromotive furniture drive, the direction in which lowering of the furniture part could start due to increased weight loading experiences an increased braking effect.

Figure 6A:
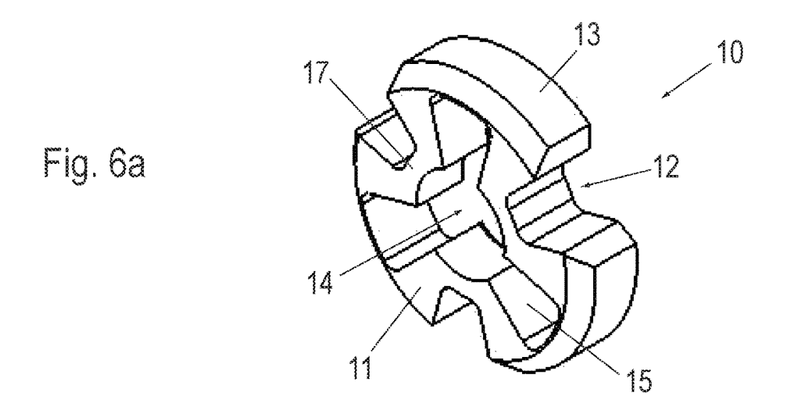
FIGS. 6a-6c each an isometric view of a further embodiment of a braking device.
Figure 6B:
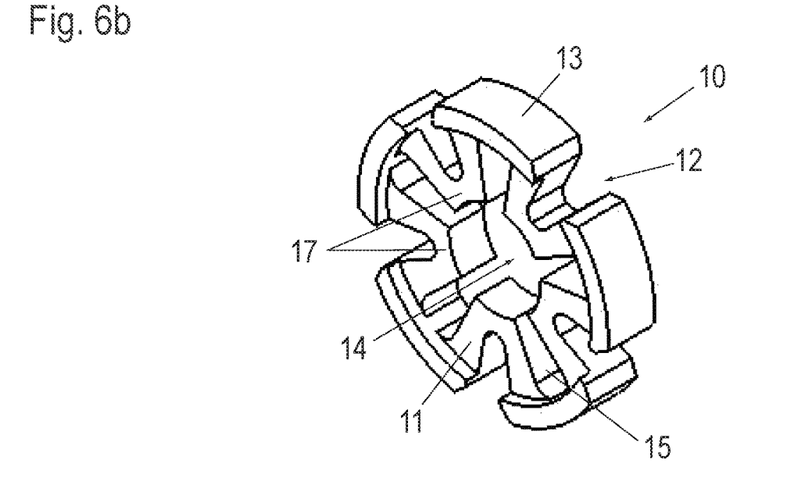
Figure 6C:
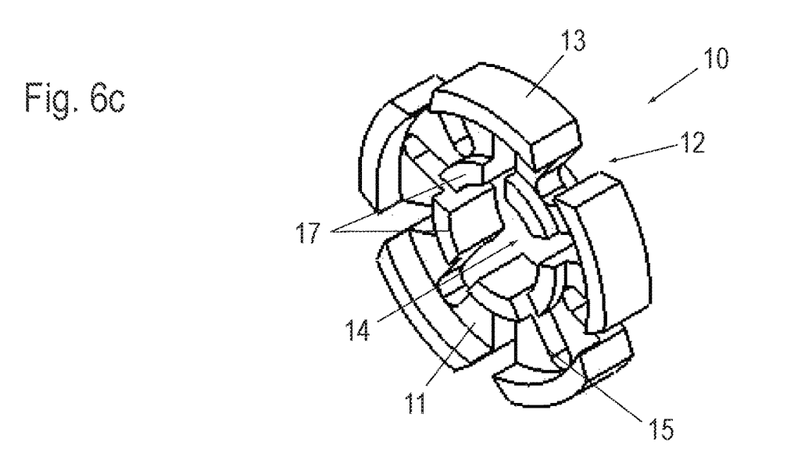

FIGS. 6a to 6c show three further embodiments of a braking device 10 according to the application, each in an isometric representation. These braking devices 10 also correspond in their basic structure to that of the first embodiment example according to FIGS. 4a and 5a, respectively, to the description of which explicit reference is hereby made. In these and all the following embodiment examples, identical reference signs indicate identical or similarly acting elements as in the previous embodiment examples.

In the case of the braking device 10 shown in FIG. 6a, instead of the six braking elements 17 shown in the first embodiment, three braking elements 17 and correspondingly also three inner recesses 15 and three outer recesses 12 are provided in each case. In principle, the braking device 10 shown could also be designed with only two braking elements 17 without the basic structure and mode of operation being different.

In the embodiments shown in FIGS. 6b and 6c, which also correspond in principle to the first embodiment shown in FIGS. 4a and 5a, respectively, five braking elements 17 and correspondingly five inner recesses 15 and outer recesses 12 are provided. In the embodiment example of FIG. 6b, the base body 11 is thinner on the inside in the axial direction than at its outer edge. In the embodiment example of FIG. 6c, the braking device 10 again has a greater thickness in the region of the braking elements, which can, for example, be selected to be equal to the thickness in the outer region.

The profiling of the base body 11 as shown can on the one hand save material and thus costs or weight, and on the other hand influence the acting spring forces.

Other parameters that can be used to influence the spring force include the overall diameter (outer diameter) of the braking device 10, the number of braking elements 17 or inner and outer notches 15, 12, and the depth of the inner or outer notches 12, 15.

Figure 7A:
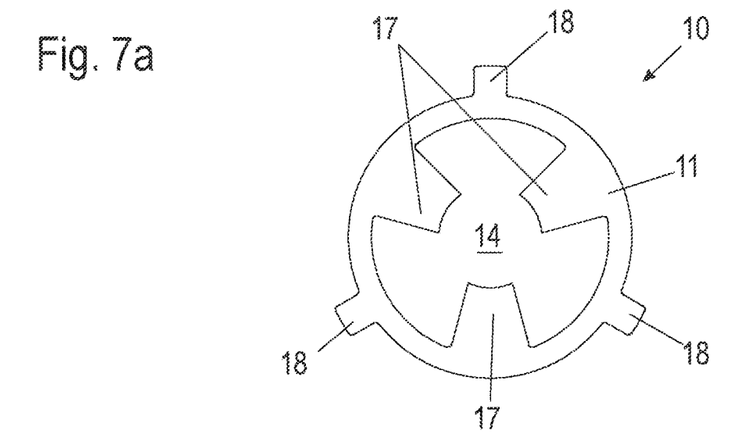
FIGS. 7a, 7b, 8 each a plan view of a further embodiment of a braking device.
Figure 7B:
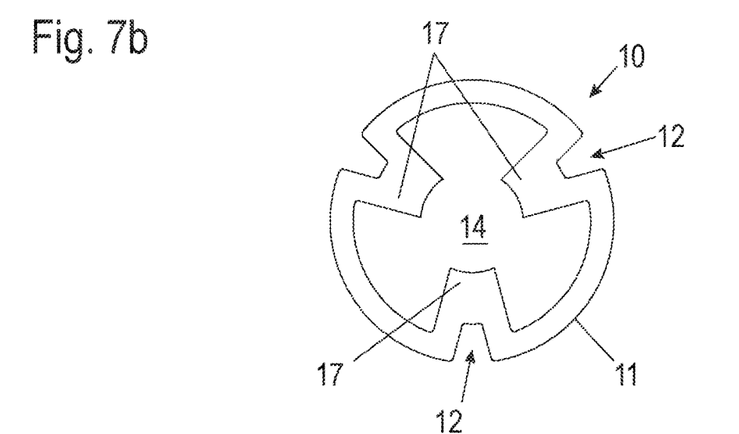

In the embodiments shown in FIGS. 7a and 7b, which also correspond in principle to the first embodiment shown in FIGS. 4a and 5a, respectively, three braking elements 17 are provided.

In the embodiment of FIG. 7a, the basic body 11 is designed as a closed ring and is inherently resilient. The resilient effect is achieved, for example, by the arcuate connecting sections of the basic body 11 between the brake elements 17. The design according to FIG. 7a has outwardly projecting projections 18, here in the form of webs, on the outer lateral surface of the annular basic body 11 for the rotationally fixed connection. Here, each of the projections 18 is angularly offset from the braking element 17, the angular offset being 60°, thus providing a symmetrical arrangement between the projections 18 and the braking elements 17. It should be mentioned, however, that the position of the projections 18 relative to the braking elements 17 can also be selected differently than shown here, for example be arranged congruently and concentrically to each other.

The version shown in FIG. 7b has inwardly directed incisions 13 on the outer lateral surface of the annular basic body 11 for the rotationally fixed connection. Since the incisions extend into the braking elements 17 from the outside, in this embodiment the basic body 11 can still be regarded as closed or essentially closed. Exemplarily, according to the embodiments shown in FIGS. 7a and 7b, three projections 18 and three inwardly directed incisions 13 are shown, respectively, wherein alternatively at least one projection 18 and one incision 13 are provided, respectively.

Figure 8:
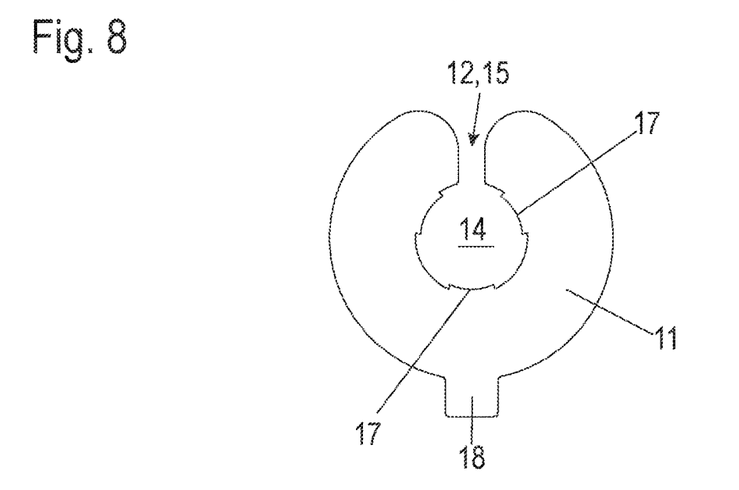

FIG. 8 illustrates a further alternative design of a braking device 10 with a base body 11 and three braking elements 17. Here, too, the design is annular, the base body 11 being provided as a disc-shaped ring with a continuous incision which is made in the base body starting from the central opening 14 and penetrates the latter as far as the outer lateral surface. The incision can thus be regarded as a combination of an inner and an outer incision 12, 15. Furthermore, a projection 18 is also provided here on the outer mantle surface of the base body 11 to prevent rotation. Exemplarily, only one web is shown. Alternatively, several webs may be provided.

The arrangement of the braking devices and the respective rotationally fixed connection of the embodiments according to FIGS. 7a, 7b and 8 are carried out in accordance with the previously described embodiments, to which reference is hereby made.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

REFERENCE SIGN

1 Drive motor
2 Housing
3 Flange plate
4 Bearing
5 Output shaft
6 Worm
7 Axle section
10 Braking device
11 Base body
12 Outer incision
13 Protruding section
14 Central opening (axle receptable)
15 Inner incision
16 Spring tongue 17 Braking element
18 Lead
20 Furniture drive
21 Gearbox housing
22 Assembly means
23 Guide tube
24 Lifting tube
25 Motor flange mounting
26 Brake ring mounting
27 Lead

The invention claimed is:

1. A furniture drive, comprising:
an electric drive motor having an output shaft projecting beyond a motor housing; and
a braking device comprising at least one braking element and a force accumulator, wherein the force accumulator permanently applies a braking force to a friction surface of the at least one braking element, and wherein the force accumulator and the braking element are integrally formed,
wherein static and sliding friction coefficients between the friction surface of the braking element and the output shaft differ by a factor of at least 1.3, and wherein the drive motor is activatable as an EMF brake.

2. The furniture drive of claim 1, wherein the force accumulator and the brake element are made of a same material.

3. The furniture drive of claim 1, further comprising:
an annular base body circumferentially closed, at least in an outer region.

4. The furniture actuator of claim 3, further comprising:
a central opening with inner surfaces forming the friction surfaces of the braking device.

5. The furniture drive of claim 4, wherein the annular base body comprises at least one incision starting from the central opening.

6. The furniture drive of claim 5, wherein the annular base body further comprises at least one further incision starting from an outer circumference of the annular base body.

7. The furniture drive of claim 4, wherein the annular base body has a plurality of incisions starting from the central opening or a plurality of further incisions starting from an outer circumference of the annular base body, wherein the plurality of incisions or the plurality of further incisions are arranged in a star shape.

8. The furniture drive of claim 4, wherein the annular base body has a plurality of incisions starting from the central opening and a plurality of further incisions starting from an outer circumference of the annular base body, wherein the plurality of incisions and the further plurality of incisions are arranged alternating circumferentially.

9. The furniture drive of claim 4, wherein the annular base body is disc-shaped and made of a solid material.

10. The furniture drive of claim 9, wherein the annular base body is made of zinc, bronze, or PEEK.

11. The furniture drive of claim 9, wherein a surface of the annular base body forms the friction surface of the at least one braking element.

12. The furniture drive of claim 9, further comprising:
at least one additional ring segment applied to the annular base body and facing the central opening, wherein a surface of the at least one additional ring segment forms the friction surface of the braking element.

13. The furniture drive of claim 1, wherein the braking device is arranged in or on a motor mount.

14. The furniture drive of claim 1, wherein the braking device is integrated into the electric drive motor.

15. The furniture drive of claim 14, wherein the braking device is a sliding bearing for the output shaft of the electric drive motor.

16. The furniture drive of claim 1, wherein the drive motor is activatable as the EMF brake by a short circuit at terminals of the drive motor by a control device of the furniture drive.

17. The furniture drive of claim 1, wherein the furniture drive is a spindle lifting drive.

* * * * *